United States Patent
Yoshida et al.

(10) Patent No.: US 12,517,403 B2
(45) Date of Patent: Jan. 6, 2026

(54) LIQUID CRYSTAL PANEL AND LIQUID CRYSTAL DISPLAY DEVICE

(71) Applicant: Sharp Display Technology Corporation, Kameyama (JP)

(72) Inventors: Keisuke Yoshida, Kameyama (JP); Kuniaki Okada, Kameyama (JP); Hiromi Katoh, Kameyama (JP); Seiichi Uchida, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/676,704

(22) Filed: May 29, 2024

(65) Prior Publication Data

US 2024/0427203 A1     Dec. 26, 2024

(30) Foreign Application Priority Data

Jun. 21, 2023   (JP) .................. 2023-101770

(51) Int. Cl.
*G02F 1/1362* (2006.01)
*G02B 27/01* (2006.01)

(52) U.S. Cl.
CPC ... *G02F 1/136209* (2013.01); *G02B 27/0172* (2013.01); *G02F 1/136222* (2021.01); *G02F 1/136286* (2013.01)

(58) Field of Classification Search
CPC ......... G02F 1/136209; G02F 1/133512; G02F 1/136222; G02F 1/136286; G02F 1/1368
See application file for complete search history.

(56) References Cited

U.S. PATENT DOCUMENTS

| | | | |
|---|---|---|---|
| 2016/0154273 A1 | 6/2016 | Itou et al. | |
| 2020/0393730 A1* | 12/2020 | Okada | H10D 30/6755 |
| 2021/0341804 A1* | 11/2021 | Kuroe | G02F 1/13338 |
| 2022/0100043 A1* | 3/2022 | Morinaga | G02F 1/136286 |

FOREIGN PATENT DOCUMENTS

JP    2016-105121 A    6/2016

* cited by examiner

*Primary Examiner* — Angela M. Medich
(74) *Attorney, Agent, or Firm* — ScienBiziP, P.C.

(57) ABSTRACT

The present invention provides a liquid crystal panel capable of suppressing an occurrence of oblique color mixing, having excellent transmittance, and meeting the need for higher definition. The present invention also provides a liquid crystal display device and a head mounted display device including the liquid crystal panel. The liquid crystal panel includes: a first substrate having a plurality of pixels arranged in a matrix; a second substrate facing the first substrate; and a liquid crystal layer located between the first substrate and the second substrate. The first substrate includes a support substrate, a plurality of source lines, a plurality of gate lines, and a plurality of switching elements. Each of the pixels is defined by two gate lines adjacent to each other and two source lines adjacent to each other, and includes a pixel electrode and a color filter layer.

16 Claims, 10 Drawing Sheets

LIQUID CRYSTAL PANEL AND LIQUID CRYSTAL DISPLAY DEVICE

CROSS-REFERENCE TO RELATED APPLICATIONS

The present application claims priority under 35 U.S.C. § 119 to Japanese Patent Application No. 2023-101770 filed on Jun. 21, 2023, the contents of which are incorporated herein by reference in their entirety.

BACKGROUND OF THE INVENTION

Field of the Invention

The following disclosure relates to a liquid crystal panel and a liquid crystal display device.

Description of Related Art

A liquid crystal panel which is a main component of a liquid crystal display device typically has a configuration in which a TFT array substrate on which pixel electrodes and switching elements are disposed and a color filter substrate as a counter substrate are bonded to each other with a liquid crystal layer interposed therebetween. In such a liquid crystal panel, an amount of transmitted light is controlled by applying a voltage to the liquid crystal layer and changing the alignment of liquid crystal molecules according to the applied voltage.

In recent years, liquid crystal panels have been required to have higher resolution (that is, higher definition). In a high-definition liquid crystal panel, an area per pixel is smaller than that of a low-definition liquid crystal panel. For example, VR-HMD applications need specifications in which a pixel pitch is less than 10 μm. When the pixel has high definition, the influence of a decrease in the aperture ratio increases. Therefore, in order to ensure the aperture ratio, the line width of a light-shielding layer between adjacent different colors is designed to be thin to be about 3 μm in each substrate. During bonding of substrates to each other, a variation (also referred to as positional deviation) of about 1 to 2 μm generally occurs. Therefore, the problem of "oblique color mixing" is more remarkable as the line width of the light-shielding layer is narrower. The oblique color mixing is a phenomenon in which light of an adjacent color is mixed when light is obliquely transmitted through the liquid crystal layer, by which visibility is reduced.

As a technique for suppressing positional deviation during bonding of substrates, a technique for disposing a color filter on the TFT array substrate side, that is, a technique for forming the TFT array substrate to have a color filter on array (COA) structure, has been developed, for example. JP 2016-105121 A, for example, discloses a color filter substrate including both switching elements and a color filter layer.

FIG. 17 is a schematic cross-sectional view conceptually illustrating an example of a conventional liquid crystal panel 1R. As illustrated in FIG. 17, the liquid crystal panel 1R has a configuration in which a TFT array substrate 10 and a counter substrate 30 are bonded to each other with a liquid crystal layer 20 interposed therebetween. Color filter layers CF are formed on the counter substrate 30, and a light-shielding layer BM is disposed so as to overlap a boundary between two adjacent color filter layers CF. In this case, a large positional deviation occurs during bonding, and further, oblique color mixing occurs in which the color of the adjacent color filter layer CF is mixed with light 1LB obliquely incident from a light source installed on the side of the TFT array substrate 10 opposite to the liquid crystal layer 20. FIG. 17 is a diagram illustrating a mechanism of an occurrence of oblique color mixing in the conventional liquid crystal panel.

In view of this, the present inventors have intensively studied the technology for suppressing the oblique color mixing, and have paid attention to the fact that the TFT array substrate needs to have a COA structure in order to prevent the occurrence of the oblique color mixing even if there is a positional deviation during bonding, considering that a pixel electrode that regulates the alignment of liquid crystal molecules is disposed on the TFT array substrate side. It is conceivable that the TFT array substrate having the COA structure can be efficiently obtained by, for example, a structure in which the color filter layer is disposed above a circuit of the TFT array substrate, a contact portion penetrating the color filter layer is provided, and the circuit in a lower layer is connected to a pixel electrode in an upper layer via the contact portion. However, it is necessary to dispose a light-shielding layer at a joint between adjacent colors to shield the joint from light. In addition, since the color filter layer is not disposed in the contact portion, it is necessary to block light transmitted through the contact portion. Therefore, a lattice-shaped black matrix (also referred to as BM) surrounding each pixel is required.

In view of this, the arrangement of the BM has been further studied. When the BM is formed on, for example, the counter substrate side, it is difficult to exhibit a function of shielding the joint between colors from light in consideration of positional deviation during bonding of the substrates. On the other hand, when the BM is formed on the TFT array substrate side, and the BM is formed of resin, a level difference due to the resin deteriorates the flatness of the substrate surface, entailing problems of an occurrence of alignment disturbance of the liquid crystal and a decrease in contrast, and a difficulty in controlling a cell thickness. Thus, it is difficult to apply this configuration. In order to reduce the level difference, it is also conceivable to form the BM with a metal material (that is, to adopt a metal BM). However, metal has high reflectance, and the metal BM impairs the reflectance of the liquid crystal display device.

JP 2016-105121 A proposes that a display portion in a color filter substrate having a COA structure is specially divided, and proposes that a light-shielding layer facing a gate line included in the color filter substrate is provided on a counter substrate side. JP 2016-105121 A describes, in order to prevent reflection of light by a source line: (i) a method for forming an antireflection film made of a material such as titanium nitride (TiN) on a surface of the source line, or (ii) a method for overlapping ends of colored color filters in the vicinity of the source line, and these methods make it unnecessary to provide a light-shielding layer overlapping the source line. However, the device in JP 2016-105121 A cannot sufficiently suppress the oblique color mixing. In addition, the method (ii) for shielding light by overlapping colors may cause a variation in a width of multiple overlapping colors, a film thickness of each color, or the like, and thus, provides unstable light-shielding characteristics. The antireflection film using TiN in the method (i) has a reflectance much higher than that of a popular resin BM, and thus is not practical as a substitute for the BM.

The present invention has been made in view of the above current situation, and an object of the present invention is to provide a liquid crystal panel that can suppress the occurrence of oblique color mixing, has excellent transmittance, and can meet the need for high definition. The present invention also provides a liquid crystal display device and a head mounted display device including the liquid crystal panel.

BRIEF SUMMARY OF THE INVENTION (1) In one embodiment of the present invention, a liquid crystal panel includes: a first substrate including a plurality of pixels arranged in a matrix; a second substrate facing the first substrate; and a liquid crystal layer located between the first substrate and the second substrate, the first substrate including a support substrate, a plurality of source lines, a plurality of gate lines substantially orthogonal to the source lines, and a plurality of switching elements disposed at intersections of the source lines and the gate lines, each of the pixels being defined by two gate lines adjacent to each other and two source lines adjacent to each other, each of the pixels including a pixel electrode and a color filter layer, a first light-shielding layer being provided between two color filter layers adjacent to each other, the second substrate including a support substrate and a second light-shielding layer, the first light-shielding layer and the second light-shielding layer being disposed in directions substantially orthogonal to each other.

(2) In an embodiment of the present invention, the liquid crystal panel includes the structure (1), the first light-shielding layer overlaps one of a set of the gate lines and a set of the source lines, and the second light-shielding layer overlaps the other of the set of the gate lines and the set of the source lines.

(3) In an embodiment of the present invention, the liquid crystal panel includes the structure (1) or (2), the first light-shielding layer overlaps the source lines, and the second light-shielding layer overlaps the gate lines.

(4) In an embodiment of the present invention, the liquid crystal panel includes the structure (1), (2), or (3), the first light-shielding layer is formed of a metal material, and the second light-shielding layer is formed of a resin material.

(5) In another embodiment of the present invention, the liquid crystal panel includes the structure (4), and the first light-shielding layer has a multilayer structure that includes two or more metal layers disposed with an insulating layer interposed between the metal layers.

(6) In an embodiment of the present invention, the liquid crystal panel includes the structure (3), (4), or (5), and the second light-shielding layer has a width equal to or less than a width of each of the gate lines.

(7) In an embodiment of the present invention, the liquid crystal panel includes the structure (1), (2), (3), (4), (5), or (6), the first substrate further includes a common electrode.

(8) In an embodiment of the present invention, the liquid crystal panel includes the structure (7), the first light-shielding layer is formed of a metal material, and is disposed to be in contact with the common electrode.

(9) In an embodiment of the present invention, the liquid crystal panel includes the structure (1), (2), (3), (4), (5), (6), (7), or (8), the first substrate further includes a first horizontal alignment film, the first horizontal alignment film including one surface that is disposed in contact with the liquid crystal layer, and another surface that is disposed in contact with the first light-shielding layer, and the second substrate further includes a second horizontal alignment film in contact with the liquid crystal layer.

(10) In an embodiment of the present invention, the liquid crystal panel includes the structure (1), (2), (3), (4), (5), (6), (7), (8), or (9), each of the pixels further includes a contact hole provided in the color filter layer, the switching element and the pixel electrode are electrically connected via the contact hole, and the second light-shielding layer overlaps the contact hole.

(11) In an embodiment of the present invention, the liquid crystal panel includes the structure (1), (2), (3), (4), (5), (6), (7), (8), (9), or (10), at least one of the plurality of pixels further includes a columnar spacer, the columnar spacer overlaps the second light-shielding layer, and the columnar spacer has a width larger than a width of the second light-shielding layer.

(12) In an embodiment of the present invention, the liquid crystal panel includes the structure (1), (2), (3), (4), (5), (6), (7), (8), (9), (10), or (11), and the second substrate further includes a third light-shielding layer at a position overlapping the first light-shielding layer.

(13) In an embodiment of the present invention, the liquid crystal panel includes the structure (12), the first light-shielding layer is formed of a metal material, and the third light-shielding layer is formed of a resin material.

(14) In an embodiment of the present invention, the liquid crystal panel includes the structure (12) or (13), and the third light-shielding layer has a width equal to or less than a width of the first light-shielding layer.

(15) In another embodiment of the present invention, a liquid crystal display device includes the liquid crystal panel according to (1), (2), (3), (4), (5), (6), (7), (8), (9), (10), (11), (12), (13), or (14).

(16) In another embodiment of the present invention, a head mounted display device includes the liquid crystal panel according to (1), (2), (3), (4), (5), (6), (7), (8), (9), (10), (11), (12), (13), or (14).

The present invention can provide a liquid crystal panel that can suppress an occurrence of oblique color mixing, has excellent transmittance, and can meet the need for higher definition. The present invention can also provide a liquid crystal display device and a head mounted display device including the liquid crystal panel.

DETAILED DESCRIPTION OF THE INVENTION

Definition of Terms

Figure 1:
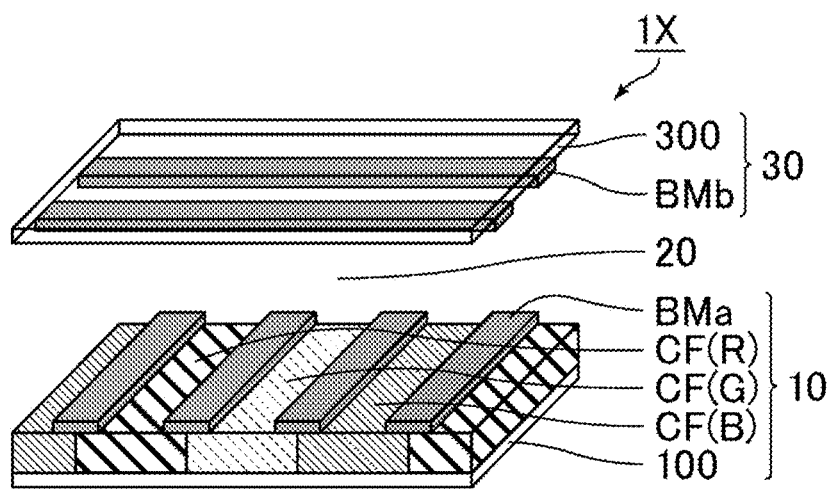
FIG. 1 is a diagram conceptually illustrating a structure of a liquid crystal panel.

In the present specification, a viewing surface side means a side closer to a screen (display surface) of an image display device, and a back surface side means a side farther from the screen (display surface) of the image display device.

Being substantially parallel means that the angle (absolute value) formed by two lines is within a range of 0°±10°, and this angle is preferably within a range of 0°±5°, more preferably 0° (that is, this means being parallel in a narrow sense). Bing substantially perpendicular (or being substantially vertical) means that the angle (absolute value) formed by two lines is within a range of 90°±10°, and this angle is preferably within a range of 90°±5°, more preferably 90° (that is, this means being orthogonal or perpendicular in a narrow sense).

The transmittance is visible light transmittance. The visible light means light having a wavelength of 380 nm or more and less than 800 nm.

Hereinafter, a liquid crystal panel and a liquid crystal display device according to embodiments of the present invention will be described. The present invention is not limited to the contents described in the following embodiments, and a design change can be appropriately made within a scope that satisfies the configuration of the present invention.

Note that, in the drawings, (R), (G), and (B) given after the reference signs of a color filter layer CF and a pixel Px mean red, green, and blue, respectively, but are not limited thereto.

First Embodiment

Figure 2:
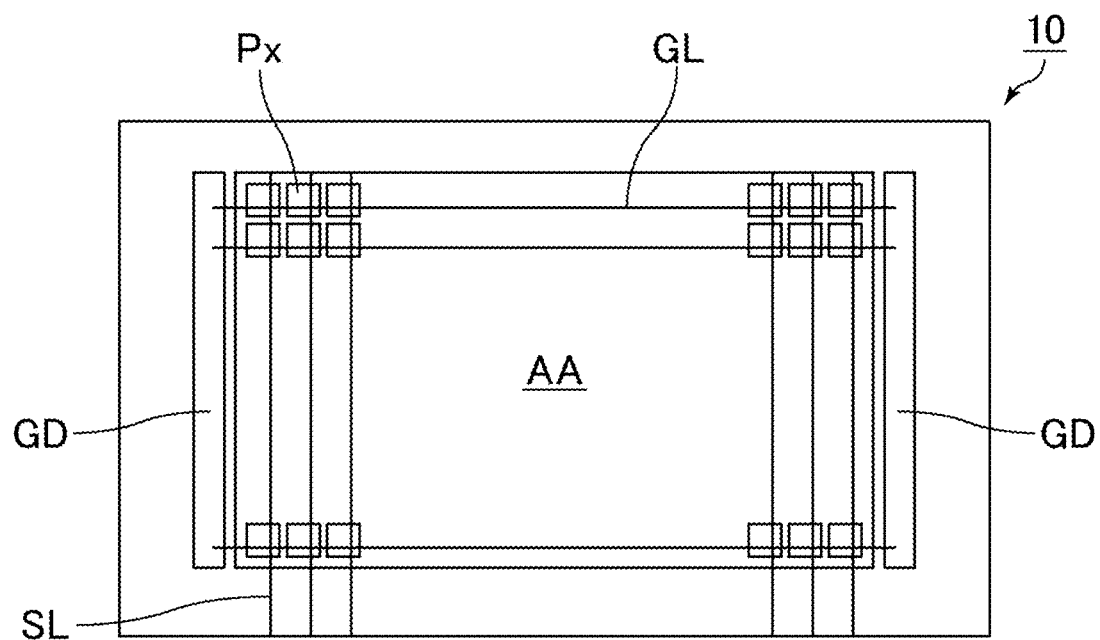
FIG. 2 is a schematic plan view of the entire liquid crystal panel as viewed from a viewing surface side.
Figure 3:
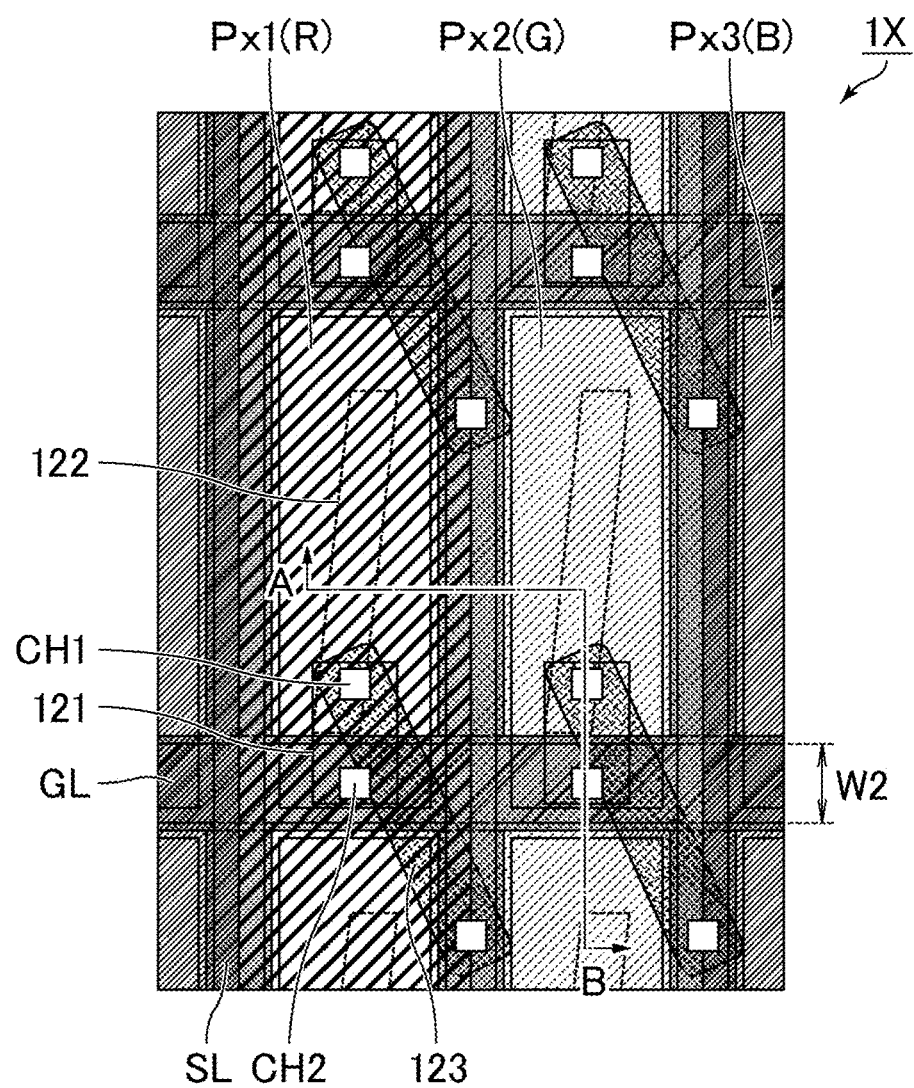
FIG. 3 is a schematic plan view illustrating a part of the liquid crystal panel which is enlarged.
Figure 4:
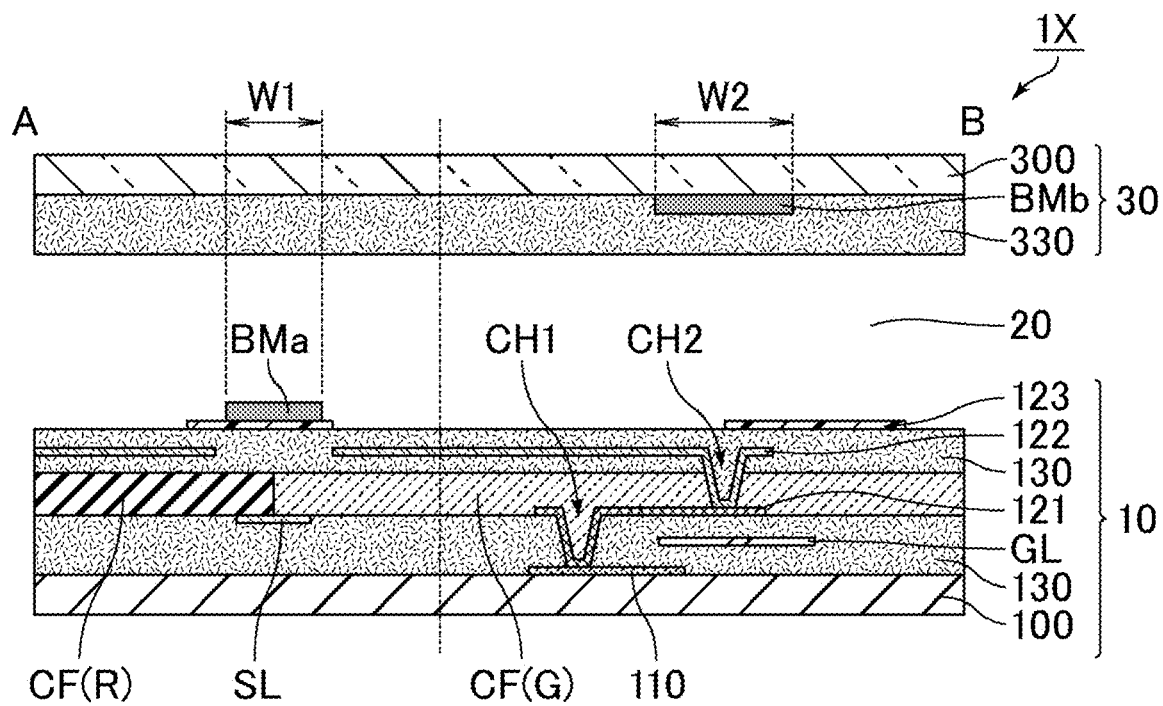
FIG. 4 is a cross-sectional view (A-B cross-sectional view) taken along line A-B in FIG. 3.

FIG. 1 is a diagram conceptually illustrating a structure of a liquid crystal panel according to one example of the present embodiment. FIG. 2 is a schematic plan view of the entire liquid crystal panel as viewed from a viewing surface side. FIG. 3 is a schematic plan view illustrating a part of the liquid crystal panel which is enlarged. FIG. 4 is a cross-sectional view (A-B cross-sectional view) taken along line A-B in FIG. 3.

As illustrated in FIG. 1, a liquid crystal panel 1X includes a first substrate 10, a liquid crystal layer 20, and a second substrate 30 in this order. That is, the liquid crystal layer 20 is sandwiched between the first substrate 10 and the second substrate 30 which are disposed to face each other. For example, the first substrate 10, the liquid crystal layer 20, and the second substrate 30 are arranged in this order from the back surface side toward the viewing surface side. The liquid crystal layer 20 is commonly sealed between the first substrate 10 and the second substrate 30 with a sealant (not illustrated).

The first substrate 10 has a plurality of pixels Px arranged in a matrix (see FIG. 2). Specifically, the first substrate 10 includes a support substrate 100, and a plurality of source lines (also referred to as signal lines) SL, a plurality of gate lines (also referred to as scanning lines) GL, and a plurality of switching elements 110 disposed on the support substrate 100. The support substrate 100 is preferably transparent and has an insulating property. Examples of the support substrate 100 include a glass substrate and a plastic substrate.

As illustrated in FIG. 2, the plurality of source lines SL is arranged substantially parallel to each other along a column direction (vertical direction in the drawing) in a display portion AA at the center of the liquid crystal panel 1X. The plurality of gate lines GL is arranged substantially parallel to each other along a row direction (horizontal direction in the drawing) so as to intersect substantially vertically to the source lines SL. The plurality of source lines SL and the plurality of gate lines GL are formed in a matrix shape (lattice shape) as a whole so as to define the pixels. A substantially rectangular region surrounded by two gate lines GL adjacent to each other and two source lines SL adjacent to each other is one pixel. That is, each pixel Px is defined by two gate lines GL adjacent to each other and two source lines SL adjacent to each other. In FIG. 2, gate drivers GD are disposed on both sides (left and right sides in the drawing) of the display portion AA, but the gate driver GD may be disposed on either the left side or the right side.

In each pixel Px, the switching element 110 is disposed at an intersection between the source line SL and the gate line GL. In the present embodiment, a thin-film transistor (TFT) is used as the switching element 110. The TFT 110 (more specifically, a semiconductor portion of the TFT) is connected to a bridge electrode 121 in a drain contact portion (also referred to as a first contact portion or a first contact hole) CH1, and the bridge electrode 121 extends to a position overlapping the gate line GL (see FIG. 4). An overlapping portion of the source lines SL with the semiconductor portion of the TFT serves as a source electrode of the TFT, and an overlapping portion of the gate lines GL with the semiconductor portion of the TFT serves as a gate electrode of the TFT (not illustrated).

As illustrated in FIG. 4, a color filter layer CF is disposed above (note that the support substrate 100 side is defined as a lower side) the gate lines GL, the source lines SL, and the bridge electrode 121. The color filter layer CF is provided with a second contact portion (also referred to as a second contact hole) CH2 so as to overlap the gate line GL, and the bridge electrode 121 and a first electrode 122 are connected via the second contact hole CH2. The first electrode 122 serves as a pixel electrode. That is, the TFT 110 and the pixel electrode 122 are electrically connected via the second contact hole CH2. An insulating film 130 is formed on the pixel electrode 122, and a second electrode 123 is formed thereon. The second electrode 123 serves as a common electrode (also referred to as a common electrode). An insulating film or a planarization film is provided between the layers or electrodes as necessary (denoted by the reference sign 130 in the drawing).

The pixel electrode 122 is disposed in each of the plurality of pixels Px, and the common electrodes 123 are disposed so as to face the plurality of pixel electrodes 122 respectively disposed in the pixels Px. In each of the common electrodes 123, a clearance such as a dot or a slit is provided in a pixel portion of a planar electrode. Each of the bridge electrode 121, the pixel electrode 122, and the common electrode 123 is preferably a transparent electrode. The transparent electrode is preferably formed of, for example, a transparent conductive material such as indium tin oxide (ITO), indium zinc oxide (IZO), zinc oxide (ZnO), or tin oxide (SnO), or an alloy thereof.

The color filter layer CF is disposed in each pixel Px of the first substrate 10. In FIGS. 3 and 4, a first pixel Px1 includes a red color filter layer CF(R), and a second pixel Px2 adjacent to the first pixel Px1 includes a green color filter layer CF(G). A first light-shielding layer BMa is provided between the two color filter layers CF adjacent to each other (see FIG. 4). The wording "the first light-shielding layer BMa is provided between the two color filter layers CF adjacent to each other" means that the first light-shielding layer BMa is disposed so as to overlap the boundary between the two color filter layers CF adjacent to each other. In plan view, it is visually recognized that the first light-shielding layer BMa is disposed between the two color filter layers CF adjacent to each other. In FIG. 4, the first light-shielding layer BMa is disposed so as to overlap both of the two color filter layers CF adjacent to each other, and thus also overlaps the boundary between the color filter layers CF.

The second substrate 30 is disposed to face the first substrate 10, and includes a support substrate 300 and a second light-shielding layer BMb. The second substrate 30 preferably further includes a planarization film 330 (see FIG. 4) for planarizing the surface. The support substrate 300 is preferably transparent and has an insulating property. Examples of the support substrate 300 include a glass substrate and a plastic substrate.

Figure 5:
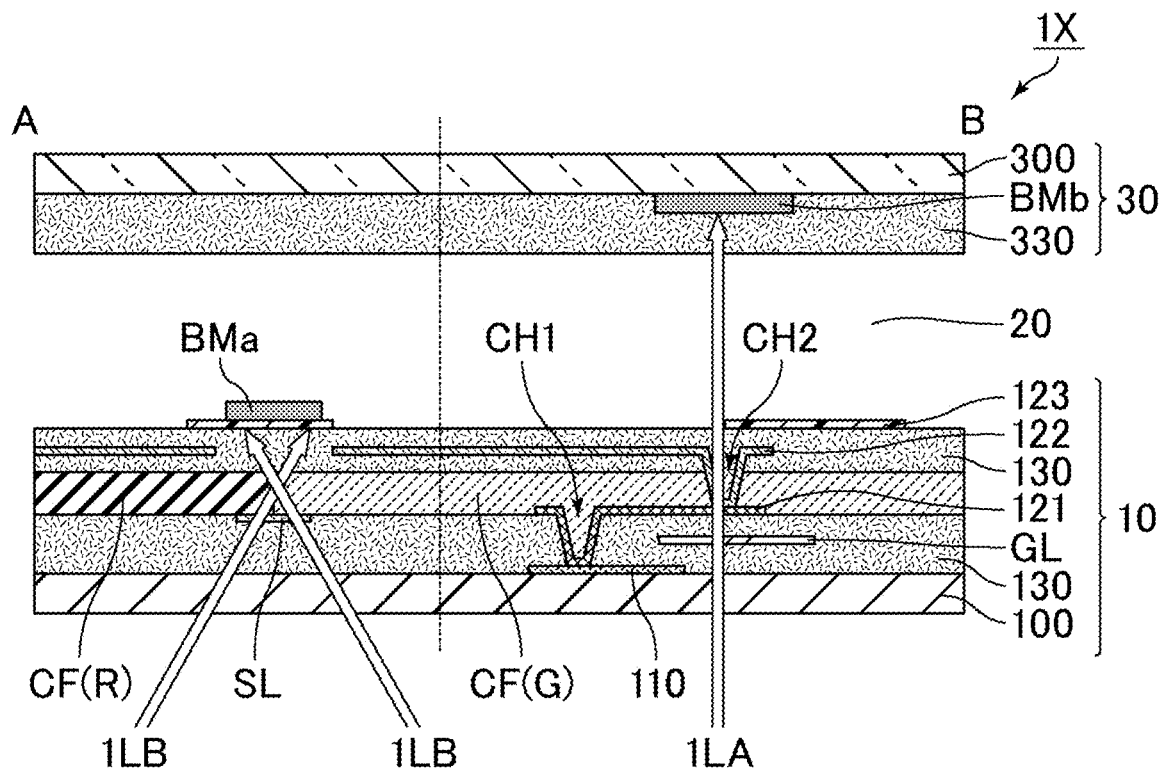
FIG. 5 is a diagram for describing a light-shielding mechanism.

The first light-shielding layer BMa included in the first substrate 10 and the second light-shielding layer BMb included in the second substrate 30 are arranged in directions substantially orthogonal to each other. Among them, the first light-shielding layer BMa shields a joint between adjacent colors from light, and sufficiently suppresses mixing of the adjacent colors when viewed obliquely. That is, when, for example, a light source is disposed on the reverse side of the first substrate 10 relative to the liquid crystal layer 20, light 1LB obliquely incident from the light source to the vicinity of the boundary between the two color filter layers CF is blocked by the first light-shielding layer BMa as illustrated in FIG. 5. Therefore, mixing of adjacent colors is prevented. Since the joint between adjacent colors is also shielded from light, the display quality is improved. FIG. 5 is a diagram for describing a light-shielding mechanism. On the other hand, by providing the second light-shielding layer BMb on the second substrate 30 side, the shape of the electrode disposed on the first substrate 10 can be designed without being affected by the shape of the second light-shielding layer BMb, so that an electrode shape excellent in transmittance can be adopted. In addition, reflection can be suppressed. As described above, due to the configuration in which the light-shielding layer is provided on each of the first substrate 10 and the second substrate 30 that face each other with the liquid crystal layer 20 interposed therebetween, and the light-shielding layers are disposed in directions substantially orthogonal to each other, it is possible to suppress the occurrence of oblique color mixing and increase the transmittance. Therefore, a high-definition liquid crystal panel excellent in display quality is suitably achieved.

In particular, one of the first light-shielding layer BMa and the second light-shielding layer BMb is preferably disposed along the column direction, and the other is preferably disposed along the row direction. In particular, from the viewpoint of further exhibiting the light-shielding properties, the first light-shielding layer BMa more preferably overlaps one of a set of the gate lines GL and a set of the source lines SL, and the second light-shielding layer BMb more preferably overlaps the other. More preferably, the first light-shielding layer BMa overlaps the source lines SL, and the second light-shielding layer BMb overlaps the gate lines GL. Each of the light-shielding layers may be separated in a dotted line in one row direction or one column direction, or may be continuously provided.

In the present embodiment, the first light-shielding layer BMa overlaps the source lines SL, and the second light-shielding layer BMb overlaps the gate lines GL (see FIG. 4). The second light-shielding layer BMb also overlaps the second contact hole CH2. Therefore, when, for example, a light source is disposed on the reverse side of the first substrate 10 relative to the liquid crystal layer 20, light 1LA emitted from the light source and transmitting through the periphery of the second contact hole CH2 is blocked by the second light-shielding layer BMb as illustrated in FIG. 5. Generally, light transmitting through the periphery of the second contact hole CH2 may cause a decrease in color purity, but in the present embodiment, the transmitted light 1LA is blocked by the second light-shielding layer BMb, and thus a decrease in color purity is sufficiently suppressed.

Each of the light-shielding layers is preferably formed using a material commonly used as a material of a black matrix (also referred to as BM). Specifically, a resin material or a metal material is preferable. The resin material is preferably a black photosensitive resin material. Examples of the metal material include a single metal material containing one kind of metal and a composite metal material containing two or more kinds of metals. Specifically, for example, titanium (Ti), molybdenum (Mo), aluminum (Al), molybdenum-tungsten (MoW), and the like are preferable. When the light-shielding layer is formed of a metal material, the surface of the light-shielding layer is preferably treated with a blackening treatment from the viewpoint of reflection characteristics. Examples of the blackening treatment include a surface blackening treatment by multilayer film interference (the details will be described later in a third embodiment).

From the viewpoint of blocking transmitted light, the thickness of each of the light-shielding layers is preferably 10 nm or more, more preferably 50 nm or more. From the viewpoint of reducing the level difference on the film surface, the upper limit is preferably 1000 nm or less, more preferably 300 nm or less. The thickness referred to herein means the total thickness when the light-shielding layer has a multilayer structure.

In the present embodiment, the first light-shielding layer BMa is formed so as to overlap the source lines SL and to hold the joint between the adjacent colors (that is, the boundary between the adjacent color filter layers CF) with the source lines SL. Thus, the occurrence of oblique color mixing is more sufficiently suppressed. In addition, in order to achieve such an arrangement, the first light-shielding layer BMa is preferably formed above the color filter layer CF (note that the liquid crystal layer 20 side is defined as an upper side). In addition, from the viewpoint of reducing the level difference in the surface on the liquid crystal layer 20 side of the first substrate 10, the first light-shielding layer BMa is preferably formed of a metal material rather than a resin material that is likely to form a thick film. That is, the first light-shielding layer BMa is preferably formed of a metal material.

The first light-shielding layer BMa is preferably disposed above or below the common electrode 123 so as to be in direct contact with the common electrode 123. In the present embodiment, a surface of the first light-shielding layer BMa opposite to the liquid crystal layer 20 is in contact with the common electrode 123 (see FIG. 4). By disposing the first light-shielding layer BMa so as to be in contact with the common electrode 123, the disturbance in alignment of the liquid crystal due to the level difference is further suppressed. In particular, in a case where the first light-shielding layer BMa is formed of a metal material, the disturbance in alignment of the liquid crystal due to the level difference is further suppressed by disposing the first light-shielding layer BMa in contact with the common electrode 123 because of the metal material having conductivity.

A width W1 of the first light-shielding layer BMa is not limited as long as it can shield the joint between adjacent colors from light and suppress mixing of adjacent colors when viewed obliquely. For example, when the width W1 is 2 μm or more, such an effect can be sufficiently exhibited, and thus, preferable. The upper limit is not limited, but is preferably, for example, 10 μm or less. In the present specification, the "width" means a width in plan view.

In the present embodiment, the second light-shielding layer BMb is formed on the second substrate 30 side so as to overlap the gate lines GL and the second contact hole CH2. The second light-shielding layer BMb is preferably formed of a resin material or a metal material, and is preferably formed of a resin material in particular. When the second light-shielding layer BMb is formed of a resin material, the formation of a pattern of an electrode for controlling the alignment of the liquid crystal is further facilitated in the first substrate 10, and further, a width W2 of the second light-shielding layer BMb is easy to be adjusted. Therefore, forming the first light-shielding layer BMa using a metal material and forming the second light-shielding layer using a resin material are particularly preferable.

The width W2 of the second light-shielding layer BMb is preferably equal to or smaller than the width of the gate line GL or the source line SL overlapping the second light-shielding layer BMb. That is, the second light-shielding layer BMb is preferably disposed inside the line in plan view. As a result, a decrease in the aperture ratio can be sufficiently suppressed, so that high definition is further implemented. In the present embodiment, the second light-shielding layer BMb overlaps the gate lines GL, and thus, the width W2 is preferably equal to or less than the width of each of the gate lines GL. In a high-definition liquid crystal panel in which the pixel pitch is less than 10 μm, for example, the width W2 is preferably 5 μm or less, although the specific size varies depending on the pixel pitch. The width W2 is more preferably 4 μm or less. The width W2 is also preferably equal to or larger than the width of the second contact hole CH2 so as to be able to shield the second contact hole CH2 from light. Specifically, the width W2 is preferably 1 μm or more.

In general, in a conventional liquid crystal panel having a pixel pitch of 20 μm or more, BMs in the row direction and BMs in the column direction are formed in a lattice pattern. Generally, the width of the BM in the column direction is 4 μm or more, the width of the BM in the row direction is 10 μm or more, and a metallic line included in a TFT array substrate is disposed inside the BMs in plan view. That is, the width of the BM is commonly set wider than the metallic line so that the metallic line is not exposed. This is because, when the metallic line is exposed at an opening, light scattering at the metal edge causes a decrease in contrast. However, when the width of the BM is set wider than the metallic line as in the conventional case in a high-definition liquid crystal panel in which the pixel pitch is less than 10 μm, the influence of a decrease in the aperture ratio increases, leading to a difficulty in processing BMs. In addition, the corners of the openings of the BMs in a lattice pattern are rounded at the intersection, so that the transmission aperture ratio may be impaired. Therefore, it is not preferable to apply BMs in a lattice pattern in an ultra-high definition model having difficulty in ensuring an aperture ratio. Only the first light-shielding layer BMa (BMa overlapping the source lines SL in the present embodiment) is sufficient to only ensure the transmission quality, but it is important to apply the second light-shielding layer BMb in order to further ensure the reflection quality. The second light-shielding layer BMb is preferably disposed inside the metallic line. With this configuration, a decrease in transmittance due to the second light-shielding layer BMb can be sufficiently prevented.

An alignment film is disposed on the surfaces of the first substrate 10 and the second substrate 30 in contact with the liquid crystal layer 20 as necessary (not illustrated). The alignment film is preferably a horizontal alignment film. That is, preferably, the first substrate 10 includes a first horizontal alignment film, one of the surfaces of the first horizontal alignment film is disposed in contact with the liquid crystal layer 20, the other surface is disposed in contact with the first light-shielding layer BMa, and the second substrate 30 includes a second horizontal alignment film in contact with the liquid crystal layer 20.

In the first substrate 10 and the second substrate 30, an insulating film and a planarization film (denoted by reference signs 130 and 330) are provided as necessary as described above. The insulating film also includes a dielectric film. Examples of the insulating film and the planarization film include an organic insulating film obtained using an organic insulating material, an inorganic insulating film obtained using an inorganic insulating material, and a multilayer body of an organic insulating film and an inorganic insulating film. Examples of the organic insulating film include an organic film (relative dielectric constant ε=2 to 5) such as an acrylic resin, a polyimide resin, or a novolak resin, and a multilayer body thereof, and the film thickness of the organic insulating film is preferably, for example, 1 μm or more and 4 μm or less. From the viewpoint of preventing stray light, the organic insulating film is preferably thinner. Examples of the inorganic insulating film include inorganic films (relative dielectric constant ε=3.5 to 8) of silicon nitride (SiNx), silicon oxide ($SiO_2$), and the like, and a multilayer film thereof, and the film thickness of the inorganic insulating film is preferably, for example, 150 Å or more and 7000 Å or less. The organic insulating film and the inorganic insulating film are appropriately selected and applied.

The liquid crystal panel 1X can perform display by applying a voltage between the pixel electrode and the common electrode and applying a transverse electric field (including a fringe electric field) or a longitudinal electric field to the liquid crystal layer. Examples of the transverse electric field system include a fringe field switching (FFS)

mode and an in-plane switching (IPS) mode in which liquid crystal molecules in the liquid crystal layer are aligned parallel to the substrate surface when no voltage is applied. Examples of the longitudinal electric field system include vertical alignment (VA) in which liquid crystal molecules in the liquid crystal layer are aligned perpendicularly to the substrate surface when no voltage is applied.

The liquid crystal panel 1X may be a low-definition liquid crystal panel or a high-definition liquid crystal panel. Even when being a high-definition liquid crystal panel, the liquid crystal panel according to the present invention can provide effects of being capable of preventing the occurrence of oblique color mixing, which is particularly a significant problem in a high-definition liquid crystal panel as described above, and providing good transmittance. Therefore, the liquid crystal panel according to the present embodiment is preferably a high-definition liquid crystal panel.

A method for manufacturing the liquid crystal panel 1X is not limited. For example, the liquid crystal panel 1X can be manufactured by bonding the first substrate 10 and the second substrate 30 to each other with a columnar spacer interposed therebetween as necessary, filling the gap with a liquid crystal material to form the liquid crystal layer 20, and then dividing the obtained structure.

Next, a liquid crystal display device 1 including the liquid crystal panel 1X according to the present embodiment will be described as an example.

Figure 6:
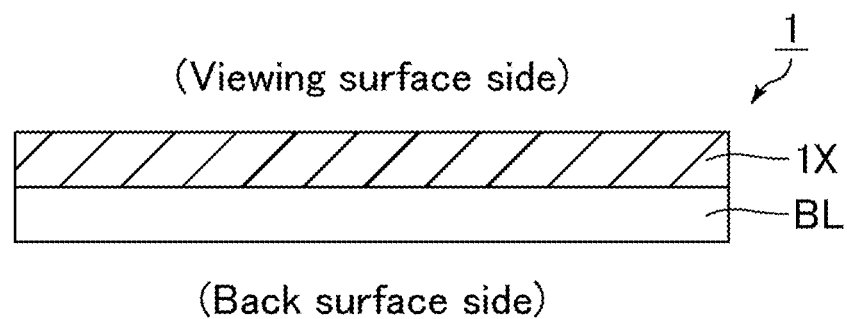
FIG. 6 is a schematic cross-sectional view of a liquid crystal display device.

FIG. 6 is a schematic cross-sectional view of the liquid crystal display device according to the present embodiment. As illustrated in FIG. 6, the liquid crystal display device 1 according to the present embodiment includes the liquid crystal panel 1X according to the present embodiment and a backlight BL as a light source.

The backlight BL is not limited as long as the backlight BL emits light, and may be a direct type, an edge type, or any other type. Specifically, for example, the backlight BL preferably includes a light source unit including a light guide plate and a light source, a reflection sheet, and a diffuser. As the light source, a light emitting diode (LED), for example, can be used.

The liquid crystal display device 1 includes, in addition to the above-described components, multiple components including a polarizing plate, external circuits such as a tape carrier package (TCP) and a printed circuit board (PCB), an optical film such as a viewing angle expansion film or a luminance enhancement film, and a bezel (frame). Some components may be incorporated in other components. The components other than the components already described are not limited, and those commonly used in the field of liquid crystal display devices can be used. Thus the description thereof will be omitted.

Figure 7:
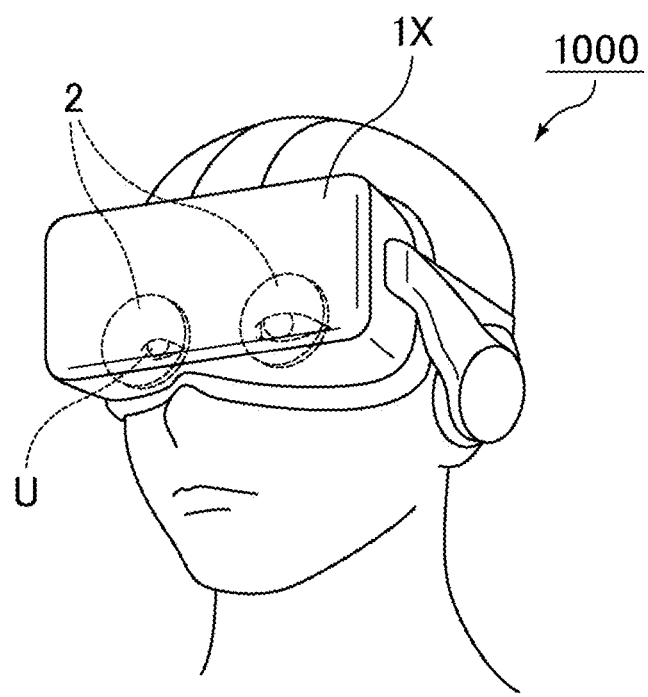
FIG. 7 is a schematic perspective view illustrating an example of an appearance of an HMD.

FIG. 7 is a schematic perspective view illustrating an example of an appearance when the liquid crystal display device 1 according to the present embodiment is used as a head mounted display (HMD), that is, an example of an appearance of an HMD including the liquid crystal panel according to the present embodiment. As illustrated in FIG. 7, a head mounted display 1000 is a display device that includes the liquid crystal panel 1X according to the present embodiment for displaying an image, an optical element 2, and a backlight (not illustrated) and is worn on the head of a user. The optical element 2 is, for example, a lens. Although FIG. 7 illustrates a binocular HMD, a monocular HMD may be used.

The display method of the HMD is not limited, and various display modes such as a horizontal alignment mode and a vertical alignment mode are preferably employed. For example, as the HMD using the horizontal alignment mode, it is preferable to employ a technology in which an opening of an electrode used for forming a fringe electric field has a characteristic shape as described in JP 2019-113584 A.

Second Embodiment

The present embodiment will mainly describe features unique to the present embodiment, and the description of the contents overlapping with the first embodiment will be omitted. The present embodiment is different from the first embodiment mainly in that a columnar spacer PS is disposed.

Figure 8:
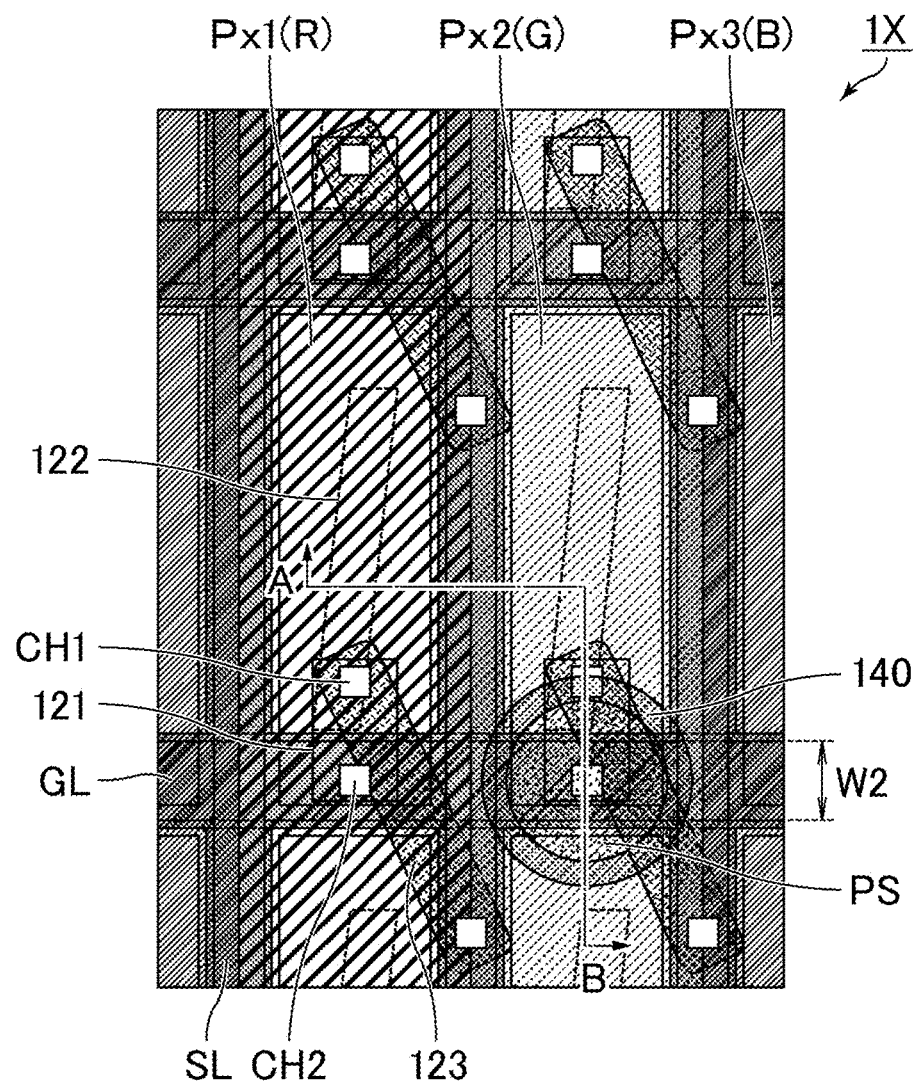
FIG. 8 is a schematic plan view illustrating a liquid crystal panel, a part of which is enlarged.
Figure 9:
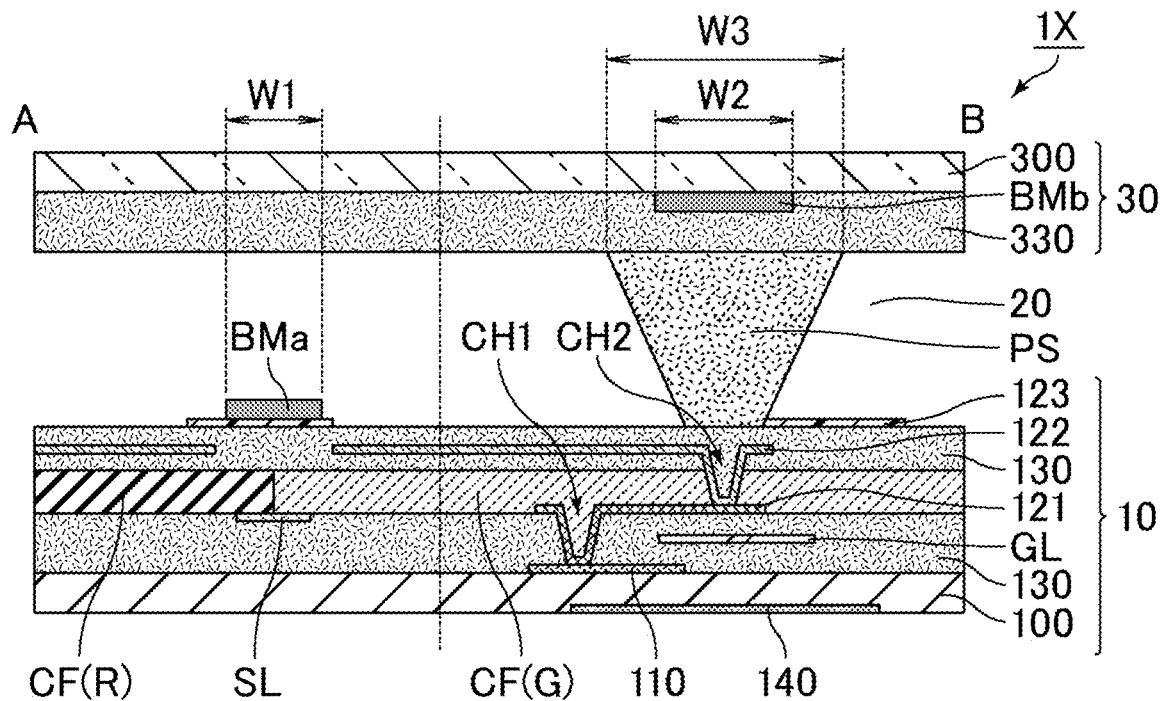
FIG. 9 is a cross-sectional view (A-B cross-sectional view) taken along line A-B in FIG. 8.

FIG. 8 is a schematic plan view illustrating a liquid crystal panel according to one example of the present embodiment, a part of which is enlarged. FIG. 9 is a cross-sectional view (A-B cross-sectional view) taken along line A-B in FIG. 8.

As illustrated in FIGS. 8 and 9, at least one of a plurality of pixels Px (Px2(G) in FIG. 8) includes the columnar spacer PS. The columnar spacer is also referred to as a photo spacer, and is disposed in order to easily control a thickness (also referred to as a cell gap or a cell thickness) of a liquid crystal layer 20. The photo spacer PS is disposed between a first substrate 10 and a second substrate 30 so as to overlap a second light-shielding layer BMb (see FIG. 9).

The photo spacer PS may protrude from the second light-shielding layer BMb in plan view. That is, a width W3 of the photo spacer PS may be larger than a width W2 of the second light-shielding layer BMb. The width W2 is preferably 5 μm or less as described above, and the W3 is preferably 5 μm or more, for example, in order to sufficiently maintain the thickness of the liquid crystal layer 20 against external pressure. In this case, the photo spacer PS almost definitely protrudes from the second light-shielding layer BMb in plan view. The width W3 of the photo spacer PS means a diameter when the shape of the photo spacer in plan view is substantially circular.

From the viewpoint of, for example, preventing a decrease in contrast, the periphery of the photo spacer PS is preferably shielded from light. Specifically, in the first substrate 10, it is preferable to extend the width of the line overlapping the photo spacer PS or to dispose a metal layer 140 that is not the lines at a position overlapping the photo spacer PS. In the present embodiment, the metal layer 140 is disposed at a position overlapping the photo spacer PS in the first substrate 10 (see FIG. 9). The metal layer 140 has a size for covering the photo spacer PS in plan view in order to shield the periphery of the photo spacer PS from light.

The metal layer 140 means a layer that is not the lines (for example, the source line SL and the gate line GL) and that is made of metal. Examples of a material for forming the metal layer 140 include a single metal material containing one kind of metal and a composite metal material containing two or more kinds of metals. Specifically, for example, molybdenum (Mo), molybdenum-tungsten (MoW), and the like are preferable.

In a conventional liquid crystal panel, it is common to employ a configuration in which a BM is disposed around the photo spacer and the photo spacer does not protrude from the BM. This is because the alignment of liquid crystal molecules around the photo spacer is disturbed from a desired alignment direction, which causes a decrease in contrast. The photo spacer is usually formed to have a diameter of 6 μm or more in order to maintain the thickness of the liquid crystal layer against external pressure. In this case, when the width of the BM disposed around the photo spacer is 5 μm or less, the photo spacer protrudes from the BM in plan view. In addition, processing control to locally widen the BM only around the photo spacer is extremely difficult. On the other hand, the present embodiment can prevent a decrease in contrast, even when the photo spacer PS protrudes from the second light-shielding layer BMb in plan view.

Third Embodiment

The present embodiment will mainly describe features unique to the present embodiment, and the description of the contents overlapping with the first embodiment will be omitted. The present embodiment is substantially the same as the first embodiment except that the configuration of a first light-shielding layer BMa is different.

Figure 10:
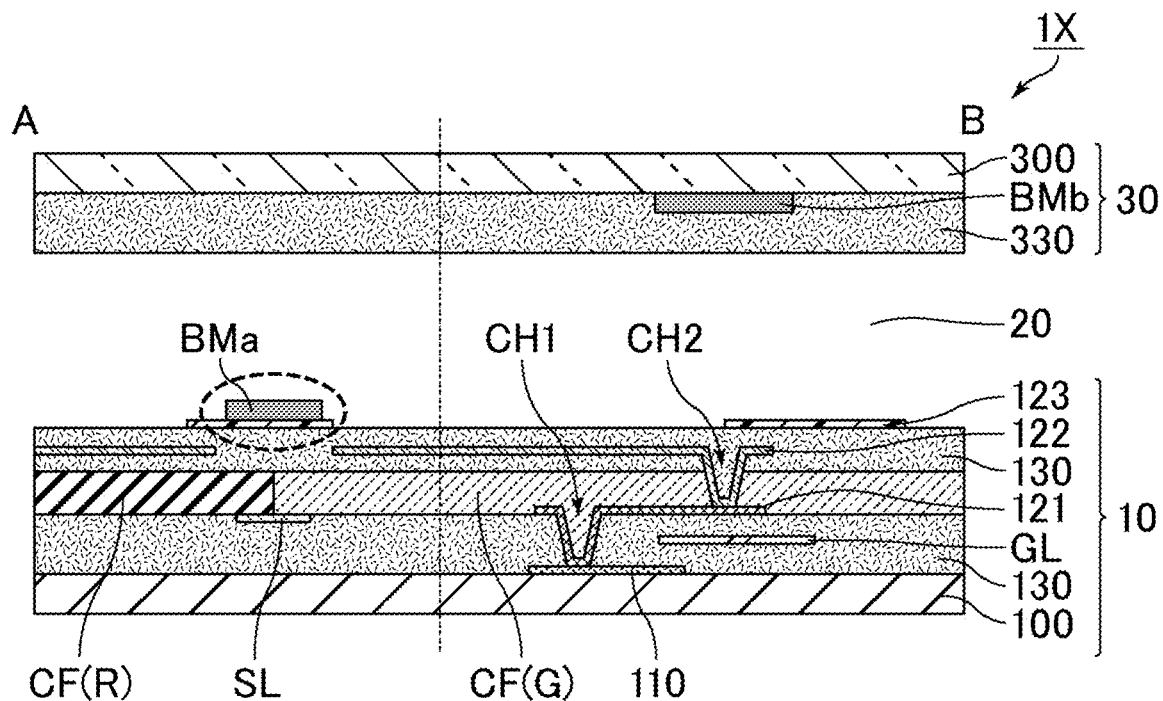
FIG. 10 is a cross-sectional view (A-B cross-sectional view) taken along line A-B in FIG. 3.
Figure 11:
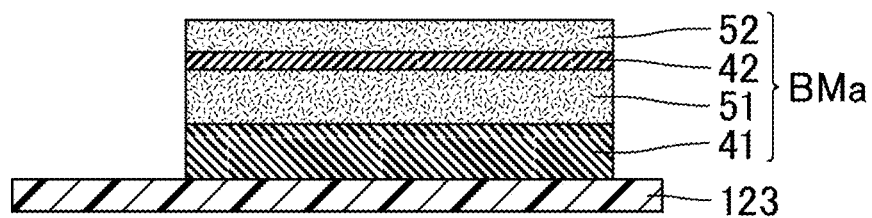
FIG. 11 is an enlarged view of a region enclosed by an ellipse indicated by a broken line in FIG. 10.

FIG. 10 is a cross-sectional view (A-B cross-sectional view) taken along line A-B in FIG. 3. FIG. 11 is an enlarged view of a region enclosed by an ellipse indicated by a broken line in FIG. 10. As illustrated in FIG. 11, a first light-shielding layer BMa is disposed on a common electrode 123 (note that a liquid crystal layer 20 side is defined as an upper side) in cross section, and has a multilayer structure that includes two or more metal layers disposed with an insulating layer interposed therebetween. Specifically, the first light-shielding layer BMa has a four-layer structure including a first metal layer 41, a first insulating layer 51, a second metal layer 42, and a second insulating layer 52 in this order. The first metal layer 41 is disposed on the common electrode 123, and the second metal layer 42 is disposed thereon with the first insulating layer 51 interposed therebetween. The second insulating layer 52 is further stacked on the second metal layer 42.

The film thickness of the first metal layer 41 located closest to a support substrate 100 among the metal layers constituting the first light-shielding layer BMa is preferably, for example, 10 to 100 nm, although it varies depending on the metal type.

The first insulating layer 51 is disposed on the first metal layer 41. The optimum film thickness of the first insulating layer 51 is most preferably 50 to 60 nm, although it varies depending on the film type of the first metal layer 41 or an upper layer to be described later and the refractive index of the insulating layer.

The second metal layer 42 is disposed on the first insulating layer 51. The reflectance due to multilayer film interference varies depending on the balance between the transmittance and the reflectance of this layer. The film thickness of the second metal layer 42 for minimizing the reflectance is most preferably 3 to 5 nm, although it varies depending on the metal type.

The second insulating layer 52 is disposed on the second metal layer 42. The second insulating layer 52 is provided for the purpose of protecting the second metal layer 42 and maintaining reflection characteristics. The film thickness is preferably as thin as possible in consideration of liquid crystal alignment, and is most preferably 20 to 30 nm.

Examples of materials for forming the metal layers 41 and 42 include a single metal material containing one kind of metal and a composite metal material containing two or more kinds of metals. Specifically, for example, molybdenum (Mo), molybdenum-tungsten (MoW), titanium (Ti), and the like are preferable.

The insulating layers 51 and 52 are preferably transparent, and are preferably inorganic insulating films obtained using an inorganic insulating material. Examples of the inorganic insulating film include inorganic films (relative dielectric constant ε=5 to 7) of silicon nitride (SiNx), silicon oxide (SiO$_2$), and the like, and a multilayer film thereof. Among them, SiN is most preferable from the viewpoint that the film thickness can be made thinner as the refractive index is higher.

Figure 12:
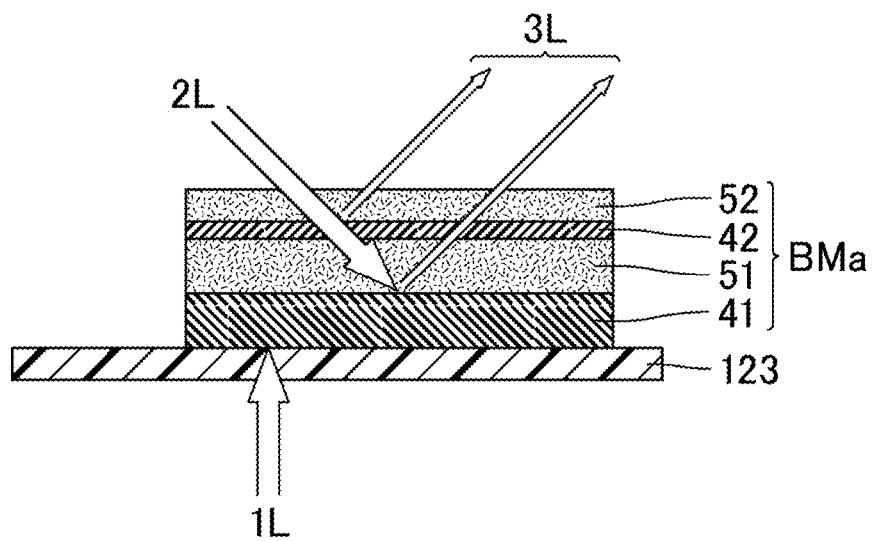
FIG. 12 is a diagram for describing a light-shielding mechanism.

In the present embodiment, the first light-shielding layer BMa has the above-described multilayer structure, thereby achieving low reflection due to multilayer film interference. For example, in a case where a light source is disposed on the reverse side of the first substrate 10 relative to the liquid crystal layer 20, transmitted light 1L from the light source is blocked by the first metal layer 41, while reflected light 3L by the first metal layer 41 (that is, light due to metal reflection) is canceled as illustrated in FIG. 12. As described above, the first light-shielding layer BMa of the present embodiment can achieve both blocking of transmitted light and low reflection, and thus, display quality is further improved. FIG. 12 is a diagram for describing a light-shielding mechanism.

First Modification of Third Embodiment

Figure 13A:
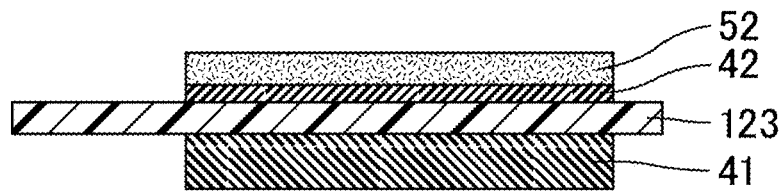
FIG. 13A is an enlarged view of a region enclosed by an ellipse indicated by a broken line in FIG. 10.

The configuration for reducing reflection due to multilayer film interference is not limited to the configuration of the third embodiment. For example, in the first light-shielding layer BMa in the third embodiment, the first metal layer 41 may be disposed below the common electrode 123, and the second metal layer 42 may be disposed above the common electrode 123 (in cross section). In this case, a multilayer film-interference blackened film in which the common electrode 123 has a function of the first insulating layer 51 is obtained. In this configuration, the first insulating layer 51 is unnecessary. FIG. 13A illustrates an example of a layer structure of the first light-shielding layer BMa in this example. FIG. 13A is an enlarged view (schematic cross-sectional view) of a region enclosed by an ellipse indicated by a broken line in FIG. 10.

Second Modification of Third Embodiment

Figure 13B:
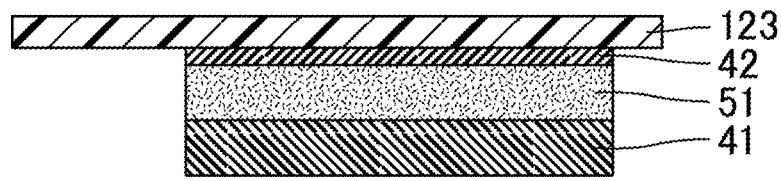
FIG. 13B is an enlarged view of a region enclosed by an ellipse indicated by a broken line in FIG. 10.

In the third embodiment, the first light-shielding layer BMa may be disposed under the common electrode 123 (in cross section). That is, the common electrode 123 may be located above the second insulating layer 52 included in the first light-shielding layer BMa in the third embodiment. This configuration can also make it possible to reduce reflection due to multilayer film interference. In this case, the second insulating layer 52 may not be provided. That is, the second insulating layer 52 may be eliminated. FIG. 13B illustrates an example of a layer structure of the first light-shielding layer BMa in this example. FIG. 13B is an enlarged view (schematic cross-sectional view) of a region enclosed by an ellipse indicated by a broken line in FIG. 10.

Third Modification of Third Embodiment

Figure 13C:
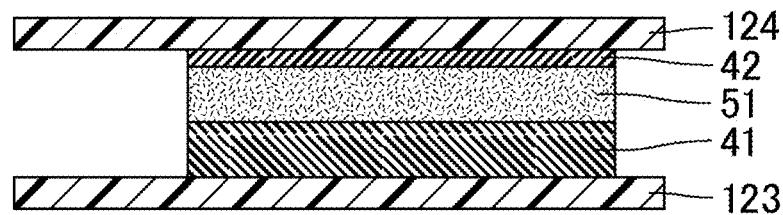
FIG. 13C is an enlarged view of a region enclosed by an ellipse indicated by a broken line in FIG. 10.

In the third embodiment, a second common electrode 124 may be further disposed on the first light-shielding layer BMa, and the first light-shielding layer BMa may be sandwiched between the common electrode 123 and the second common electrode 124 (in cross section). This configuration can also make it possible to reduce reflection due to multilayer film interference. In this case, the second insulating layer 52 may not be provided. That is, the second insulating layer 52 may be eliminated. FIG. 13C illustrates an example of a layer structure of the first light-shielding layer BMa in this example. FIG. 13C is an enlarged view (schematic cross-sectional view) of a region enclosed by an ellipse indicated by a broken line in FIG. 10.

Fourth Embodiment

The present embodiment will mainly describe features unique to the present embodiment, and the description of the contents overlapping with the first embodiment will be omitted. The present embodiment is substantially the same as the first embodiment except that a second substrate 30 includes a third light-shielding layer at a position overlapping a first light-shielding layer BMa. That is, the second substrate 30 includes a third light-shielding layer BMb2 in addition to a second light-shielding layer BMb (referred to as a second light-shielding layer BMb1 for convenience).

Figure 14:
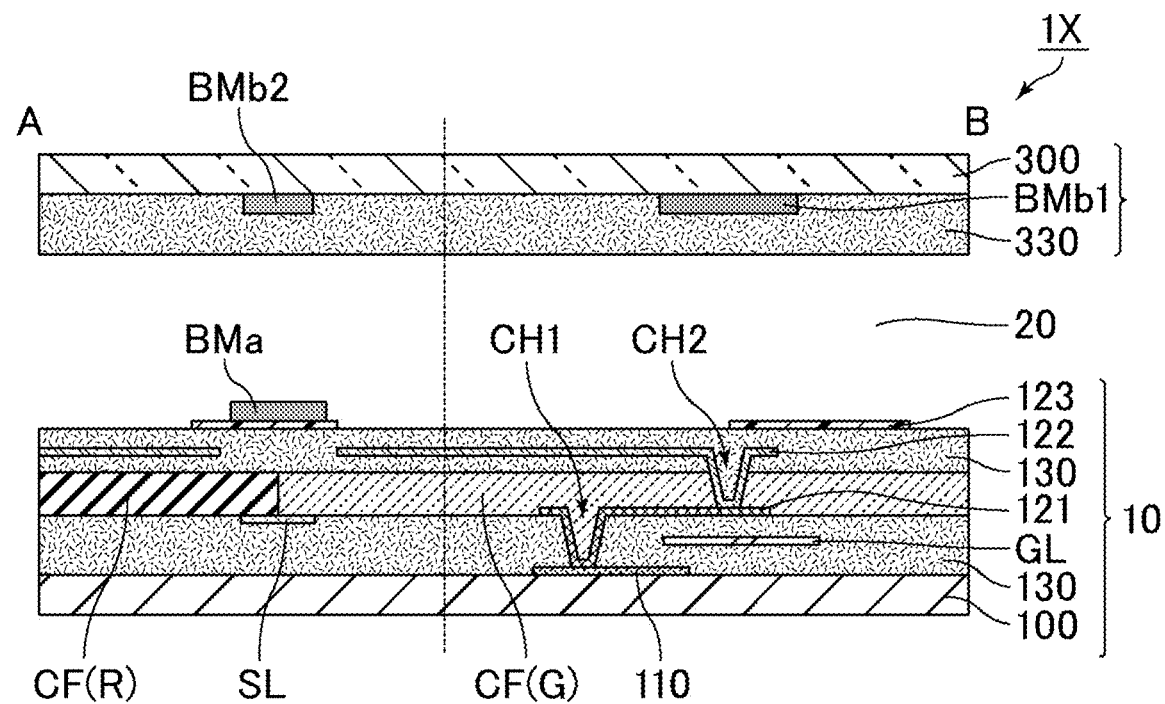
FIG. 14 is a cross-sectional view (A-B cross-sectional view) taken along line A-B in FIG. 3.

FIG. 14 is a cross-sectional view (A-B cross-sectional view) taken along line A-B in FIG. 3. The third light-shielding layer BMb2 is disposed at a position overlapping the first light-shielding layer BMa in the second substrate 30.

In the present embodiment, the first light-shielding layer BMa is also preferably formed of a metal material from the viewpoint of reducing a level difference in the surface on a liquid crystal layer 20 side of a first substrate 10. On the other hand, the third light-shielding layer BMb2 is preferably formed of a resin material from the viewpoint of suppressing metal reflection by the first light-shielding layer BMa.

The width of the third light-shielding layer BMb2 is preferably equal to or less than a width W1 of the first light-shielding layer BMa. This makes it possible to sufficiently suppress metal reflection by the first light-shielding layer BMa formed of a metal material without deteriorating transmission characteristics.

Figure 15:
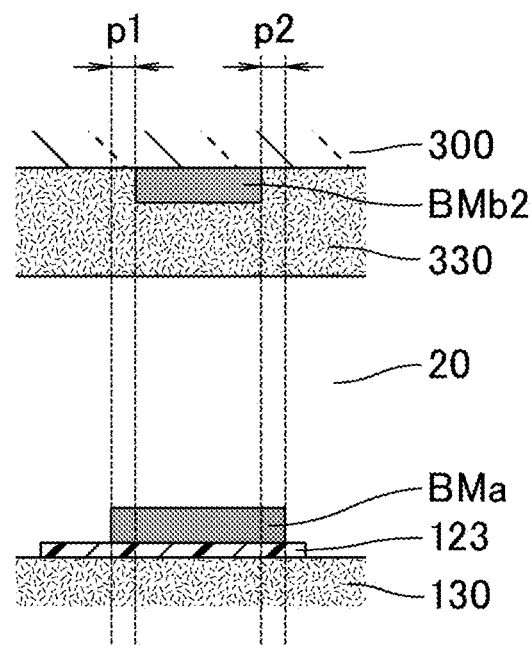
FIG. 15 is a schematic cross-sectional view focusing on a third light-shielding layer BMb2 and a first light-shielding layer BMa in FIG. 14.

Here, from the viewpoint of suppressing metal reflection without reducing the transmittance, it is ideal that the width of the first light-shielding layer BMa and the width of the third light-shielding layer BMb2 are equal, and there is no positional deviation when the first substrate 10 and the second substrate 30 are bonded to each other. However, positional deviation may actually occur, and thus, the width of the third light-shielding layer BMb2 is preferably designed to be smaller than the width of the first light-shielding layer BMa by 0 to 0.5 µm on each side in preference to the transmission aperture ratio. That is, p1 and p2 illustrated in FIG. 15 are each preferably 0 to 0.5 µm. The sum (that is, p1+p2) of p1 and p2 corresponds to a value obtained by subtracting the width of the third light-shielding layer BMb2 from the width of the first light-shielding layer BMa. Each width here is also a width in plan view, and corresponds to a length in the horizontal direction in FIG. 15 which is a cross-sectional view. FIG. 15 is a schematic cross-sectional view focusing on the third light-shielding layer BMb2 and the first light-shielding layer BMa in FIG. 14, and is a diagram for describing the relationship between the widths of the light-shielding layers.

Figure 16:
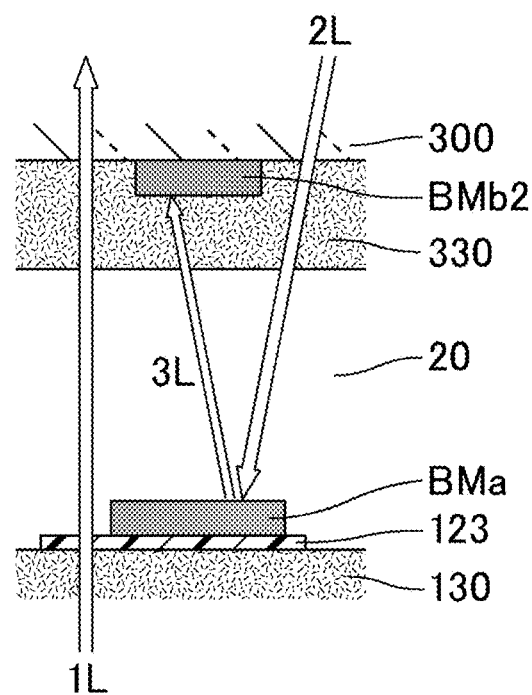
FIG. 16 is a diagram for describing a light-shielding mechanism.
Figure 17:
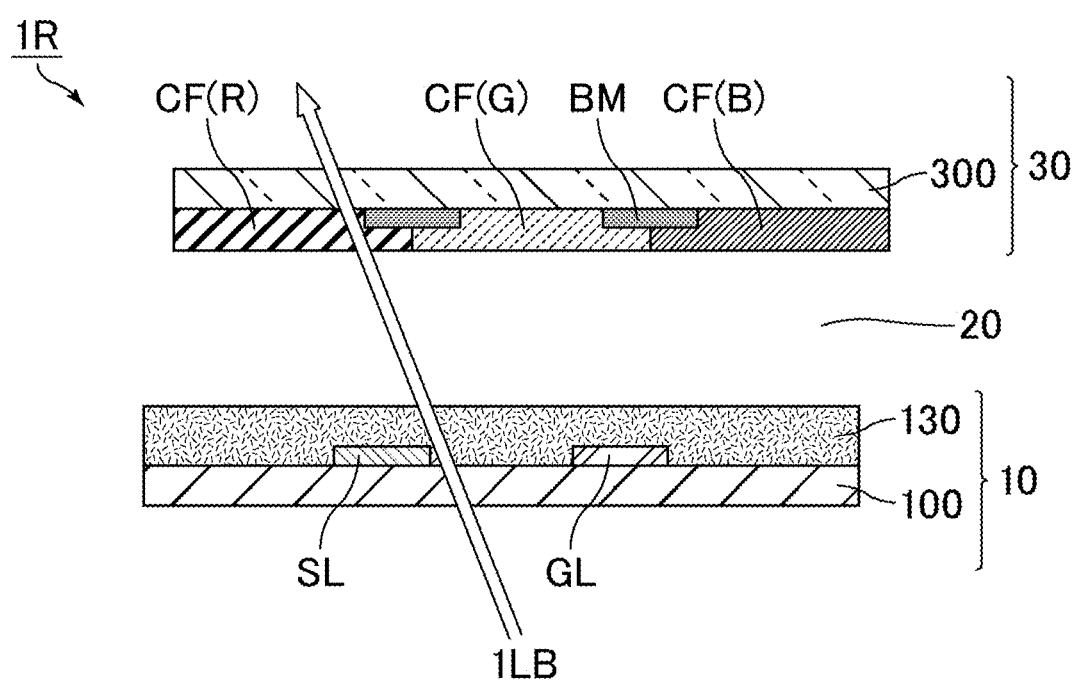
FIG. 17 is a diagram illustrating a mechanism of an occurrence of oblique color mixing in a conventional liquid crystal panel.

In the present embodiment, reflected light (that is, light due to metal reflection) 3L by the first light-shielding layer BMa is blocked (shielded) by the third light-shielding layer BMb2 provided at a position facing the first light-shielding layer BMa with the liquid crystal layer 20 interposed therebetween as illustrated in FIG. 16, for example. On the other hand, when a light source is disposed on the reverse side of the first substrate 10 relative to the liquid crystal layer 20, for example, transmitted light 1L from the light source is transmitted without being blocked by the third light-shielding layer BMb2. Therefore, it is possible to achieve the liquid crystal panel 1X in which the reflection by the first light-shielding layer BMa on the first substrate 10 side is reduced as much as possible without deteriorating the transmission characteristics. FIG. 16 is a diagram for describing a light-shielding mechanism.

While the embodiments of the present invention have been described above, all the individual matters described can be generally applied to the present invention.

The present invention will be described in more detail below by way of Examples and Comparative Examples, but the present invention is not limited only to these Examples.

Example 1

A liquid crystal panel according to the present Example corresponds to the liquid crystal panel according to the first embodiment (see FIGS. 1 to 5).

When a liquid crystal panel 1X according to the present Example is manufactured, a first light-shielding layer BMa is formed so as to overlap a plurality of source lines SL and to hold a joint between adjacent two colors (that is, boundary between adjacent color filter layers CF) with the source lines SL. The first light-shielding layer BMa is formed of a metal material and is formed so as to be in direct contact with a common electrode 123. On the other hand, a second light-shielding layer BMb is formed of a resin material or a metal material on a second substrate 30 so as to two-dimensionally overlap gate lines GL and a second contact hole CH2. Thereafter, a planarization film 330 is provided to planarize the surface on a liquid crystal layer 20 side, and then, a first substrate 10 is bonded via a photo spacer PS if necessary, and the gap is filled with a liquid crystal material. Thus, the liquid crystal panel 1X is obtained. According to the liquid crystal panel 1X according to the present Example, the joint between the adjacent colors can be shielded from light, and mixing of the adjacent colors when viewed obliquely can also be sufficiently suppressed, even when a width W1 of the first light-shielding layer BMa is about 3 µm. In addition, transmitted light around the second contact hole CH2 can also be sufficiently blocked by the second light-shielding layer BMb. Therefore, it is possible to achieve an ultra-high-definition liquid crystal panel having high transmittance and high color purity without deterioration in quality due to positional deviation during bonding.

Example 2

A liquid crystal panel according to the present Example corresponds to the liquid crystal panel according to the second embodiment (see FIGS. 1, 2, 8, and 9).

A liquid crystal panel 1X according to the present Example is substantially the same as the liquid crystal panel according to Example 1 except for having a photo spacer PS between a first substrate 10 and a second substrate 30, the photo spacer PS overlapping a second light-shielding layer BMb and having a width W3 larger than a width W2 of a second light-shielding layer BMb, and further including a metal layer 140 in a first substrate 10 at a position overlapping the photo spacer PS. The liquid crystal panel 1X according to the present Example can also exhibit the same effects as those of Example 1.

Example 3

A liquid crystal panel according to the present Example corresponds to the liquid crystal panel according to the third embodiment (see FIGS. 1 to 3 and 10 to 12).

In Example 1, the first light-shielding layer BMa is formed of a metal material. Meanwhile, the metal material has high reflection characteristics. In view of this, in order to further improve the display quality of the liquid crystal panel, a first light-shielding layer BMa has a multilayer structure including a metal layer to reduce reflection due to multilayer film interference in the present Example. In the present Example, the first light-shielding layer BMa can achieve both blocking of transmitted light and low reflection, and thus, the liquid crystal panel 1X according to the present Example has further better display quality than the liquid crystal panel according to Example 1.

Example 4

A liquid crystal panel according to the present Example corresponds to the liquid crystal panel according to the fourth embodiment (see FIGS. 1 to 3 and 14 to 16).

In Example 3, the first light-shielding layer BMa has a multilayer structure including a metal layer, so that the reflectance of metal itself is reduced by multilayer film interference. In the present Example, a third light-shielding layer BMb2 is provided at a position two-dimensionally overlapping a first light-shielding layer BMa on a counter substrate (second substrate) 30 side to reduce reflection. The liquid crystal panel 1X according to the present Example can reduce reflection by the first light-shielding layer BMa on the first substrate 10 side as much as possible without deteriorating the transmission characteristics, and thus has more satisfactory display quality than the liquid crystal panel according to Example 1.

The aspects of the present invention described above may be appropriately combined without departing from the gist of the present invention.

REFERENCE SIGNS LIST

1: liquid crystal display device
1L, 1LA, 1LB, 2L, 3L: light
1R, 1X: liquid crystal panel
10, 30: substrate
20: liquid crystal layer
41, 42: metal layer
51, 52: insulating layer
100, 300: support substrate
110: switching element
121, 122, 123, 124: electrode
130, 330: insulating film or planarization film
140: metal layer
AA: display portion
BL: backlight
BM, BMa, BMb, BMb1, BMb2: light-shielding layer
CF: color filter layer
CH1, CH2: contact hole
GD: gate driver
GL: gate line
PS: columnar spacer (photo spacer)
Px, Px1, Px2: pixel
SL: source line

What is claimed is:

1. A liquid crystal panel comprising:
a first substrate including a plurality of pixels arranged in a matrix;
a second substrate facing the first substrate; and
a liquid crystal layer located between the first substrate and the second substrate, wherein:
the first substrate includes a first support substrate, a plurality of source lines, a plurality of gate lines substantially orthogonal to the plurality of source lines, and a plurality of switching elements disposed at intersections of the plurality of source lines and the plurality of gate lines,
each of the plurality of pixels is defined by two gate lines adjacent to each other and two source lines adjacent to each other,
each of the plurality of pixels includes a pixel electrode and a color filter layer,
a first light-shielding layer is provided between two color filter layers adjacent to each other,
the second substrate includes a second support substrate and a second light-shielding layer,
the first light-shielding layer and the second light-shielding layer are disposed in directions substantially orthogonal to each other,
at least one of the plurality of pixels further includes a columnar spacer,
the columnar spacer overlaps the second light-shielding layer, and
the columnar spacer has a width larger than a width of the second light-shielding layer.

2. The liquid crystal panel according to claim 1, wherein the first light-shielding layer overlaps one of a set of the plurality of gate lines and a set of the plurality of source lines, and the second light-shielding layer overlaps the other one of the set of the plurality of gate lines and the set of the plurality of source lines.

3. The liquid crystal panel according to claim 1, wherein the first light-shielding layer overlaps the plurality of source lines, and the second light-shielding layer overlaps the plurality of gate lines.

4. The liquid crystal panel according to claim 3, wherein the width of the second light-shielding layer is equal to or less than a width of each of the plurality of gate lines.

5. The liquid crystal panel according to claim 3, wherein the first light-shielding layer is formed of a metal material, and
the second light-shielding layer is formed of a resin material.

6. The liquid crystal panel according to claim 5, wherein the width of the second light-shielding layer is equal to or less than a width of each of the plurality of gate lines.

7. The liquid crystal panel according to claim 1, wherein the first light-shielding layer is formed of a metal material, and
the second light-shielding layer is formed of a resin material.

8. The liquid crystal panel according to claim 7, wherein the first light-shielding layer has a multilayer structure that includes two or more metal layers disposed with an insulating layer interposed between the two or more metal layers.

9. The liquid crystal panel according to claim 1, wherein the first substrate further includes a common electrode.

10. The liquid crystal panel according to claim 9, wherein the first light-shielding layer is formed of a metal material, and is disposed such that to be in contact with the common electrode.

11. The liquid crystal panel according to claim 1, wherein each of the plurality of pixels further includes a contact hole provided in the color filter layer,
a corresponding switching element, among the plurality of switching elements, and the pixel electrode are electrically connected via the contact hole, and
the second light-shielding layer overlaps the contact hole.

12. A liquid crystal display device comprising the liquid crystal panel according to claim 1.

13. A head mounted display device comprising the liquid crystal panel according to claim 1.

14. A liquid crystal panel, comprising:
a first substrate including a plurality of pixels arranged in a matrix;
a second substrate facing the first substrate; and
a liquid crystal layer located between the first substrate and the second substrate, wherein:
the first substrate includes a first support substrate, a plurality of source lines, a plurality of gate lines substantially orthogonal to the plurality of source lines, and a plurality of switching elements disposed at intersections of the plurality of source lines and the plurality of gate lines,
each of the plurality of pixels is defined by two gate lines adjacent to each other and two source lines adjacent to each other,
each of the plurality of pixels includes a pixel electrode and a color filter layer,
a first light-shielding layer is provided between two color filter layers adjacent to each other,
the second substrate includes a second support substrate and a second light-shielding layer,
the first light-shielding layer and the second light-shielding layer are disposed in directions substantially orthogonal to each other, and
the second substrate further includes a third light-shielding layer at a position overlapping the first light-shielding layer.

15. The liquid crystal panel according to claim 14, wherein
the first light-shielding layer is formed of a metal material, and
the third light-shielding layer is formed of a resin material.

16. The liquid crystal panel according to claim 14, wherein
the third light-shielding layer has a width equal to or less than a width of the first light-shielding layer.

* * * * *